(12) United States Patent
Montes et al.

(10) Patent No.: US 12,263,666 B2
(45) Date of Patent: Apr. 1, 2025

(54) ASSEMBLIES OF FUNCTIONALIZED TEXTILE MATERIALS AND METHODS OF USE THEREOF

(71) Applicant: Nelumbo Inc., Hayward, CA (US)

(72) Inventors: Nicholas Joseph Montes, Hayward, CA (US); Cody D. Oliver, Hayward, CA (US); Lance R. Brockway, Hayward, CA (US); David C. Walther, Hayward, CA (US)

(73) Assignee: NELUMBO INC., Hayward, CA (US)

( * ) Notice: Subject to any disclaimer, the term of this patent is extended or adjusted under 35 U.S.C. 154(b) by 13 days.

(21) Appl. No.: 17/784,475

(22) PCT Filed: Dec. 11, 2020

(86) PCT No.: PCT/US2020/064395
§ 371 (c)(1),
(2) Date: Jun. 10, 2022

(87) PCT Pub. No.: WO2021/119372
PCT Pub. Date: Jun. 17, 2021

(65) Prior Publication Data
US 2023/0001667 A1      Jan. 5, 2023

Related U.S. Application Data

(63) Continuation-in-part of application No. PCT/US2019/065978, filed on Dec. 12, 2019.
(Continued)

(51) Int. Cl.
B32B 17/02      (2006.01)
B32B 5/02       (2006.01)
(Continued)

(52) U.S. Cl.
CPC .............. *B32B 7/027* (2019.01); *B32B 5/024* (2013.01); *B32B 9/02* (2013.01); *B32B 17/02* (2013.01);
(Continued)

(58) Field of Classification Search
CPC ....... C04B 35/10; C04B 35/04; C04B 35/453; C04B 38/0058; C04B 35/0064;
(Continued)

(56) References Cited

U.S. PATENT DOCUMENTS 8,540,889 B1    9/2013  Hartlove et al.
8,993,089 B2    3/2015  Conolly et al.
(Continued)

FOREIGN PATENT DOCUMENTS

CN    201575646 U    9/2010
CN    102748987 A    10/2012
(Continued)

OTHER PUBLICATIONS

International Search Report in corresponding International Patent Application No. PCT/US2020/064395, dated Mar. 3, 2021, 3 pages.
(Continued)

*Primary Examiner* — Humera N. Sheikh
*Assistant Examiner* — Kevin C T Li
(74) *Attorney, Agent, or Firm* — Fountainhead Law Group, PC; Jill A. Jacobson

(57) ABSTRACT

Assemblies of stacked layers of materials are described. The assemblies include functional and structural layers. Functional layers include binderless ceramic materials on woven or non-woven substrates of natural, synthetic, or metallic materials. The layers of functional and structural materials may be configured to transport moisture or heat from an inner surface to an outer surface that is exposed to an ambient environment.

20 Claims, 3 Drawing Sheets

Related U.S. Application Data

(60) Provisional application No. 63/039,965, filed on Jun. 16, 2020, provisional application No. 63/038,642, filed on Jun. 12, 2020, provisional application No. 63/038,693, filed on Jun. 12, 2020, provisional application No. 62/989,150, filed on Mar. 13, 2020, provisional application No. 62/989,092, filed on Mar. 13, 2020.

(51) Int. Cl.

| | | |
|---|---|---|
| *B32B 7/027* | (2019.01) | |
| *B32B 9/02* | (2006.01) | |
| *B32B 33/00* | (2006.01) | |
| *C04B 35/04* | (2006.01) | |
| *C04B 35/10* | (2006.01) | |
| *C04B 35/453* | (2006.01) | |
| *C04B 38/00* | (2006.01) | |
| *C08J 5/12* | (2006.01) | |
| *C09D 1/00* | (2006.01) | |
| *C09D 5/08* | (2006.01) | |
| *C09D 201/00* | (2006.01) | |
| *C23C 8/02* | (2006.01) | |
| *C23C 8/52* | (2006.01) | |
| *C23C 22/06* | (2006.01) | |
| *D06M 11/44* | (2006.01) | |
| *D06M 11/83* | (2006.01) | |
| *D06M 23/06* | (2006.01) | |
| *F28F 19/06* | (2006.01) | |
| *D06M 101/06* | (2006.01) | |
| *D06M 101/32* | (2006.01) | |
| *D06M 101/34* | (2006.01) | |

(52) U.S. Cl.
CPC ............ *B32B 33/00* (2013.01); *C04B 35/04* (2013.01); *C04B 35/10* (2013.01); *C04B 35/453* (2013.01); *C04B 38/0058* (2013.01); *C04B 38/0064* (2013.01); *C04B 38/0096* (2013.01); *C08J 5/121* (2013.01); *C09D 1/00* (2013.01); *C09D 5/08* (2013.01); *C09D 201/00* (2013.01); *C23C 8/02* (2013.01); *C23C 8/52* (2013.01); *C23C 22/06* (2013.01); *D06M 11/44* (2013.01); *D06M 11/83* (2013.01); *D06M 23/06* (2013.01); *F28F 19/06* (2013.01); *B32B 2255/20* (2013.01); *B32B 2262/08* (2013.01); *B32B 2262/101* (2013.01); *B32B 2262/128* (2021.05); *B32B 2305/188* (2013.01); *B32B 2307/304* (2013.01); *B32B 2307/728* (2013.01); *B32B 2307/73* (2013.01); *B32B 2315/02* (2013.01); *B32B 2315/08* (2013.01); *B32B 2317/10* (2013.01); *C04B 2235/3206* (2013.01); *C04B 2235/3217* (2013.01); *C04B 2235/3284* (2013.01); *C04B 2235/96* (2013.01); *D06M 2101/06* (2013.01); *D06M 2101/32* (2013.01); *D06M 2101/34* (2013.01); *D06M 2200/12* (2013.01)

(58) Field of Classification Search
CPC ........ C04B 35/0096; C04B 2235/3206; C04B 2235/3217; C04B 2235/3284; C04B 2235/96; C08J 5/121; C09D 1/00; C09D 5/08; C09D 201/00; C23C 8/02; C23C 8/52; C23C 18/1216; C23C 18/1233; C23C 18/1241; C23C 18/1295; C23C 22/06; D06M 11/44; D06M 11/45; D06M 11/46; D06M 11/83; F28F 19/02; F28F 19/06; B32B 7/027; B32B 5/024; B32B 9/02

See application file for complete search history.

(56) References Cited

U.S. PATENT DOCUMENTS

| | | |
|---|---|---|
| 9,147,633 B2 | 9/2015 | Eid et al. |
| 9,362,201 B2 | 6/2016 | Gavillet et al. |
| 2002/0187335 A1 | 12/2002 | Kelley et al. |
| 2004/0055892 A1 | 3/2004 | Oh et al. |
| 2004/0118698 A1 | 6/2004 | Lu et al. |
| 2004/0213918 A1 | 10/2004 | Mikhael et al. |
| 2006/0141268 A1 | 6/2006 | Kalkan et al. |
| 2010/0099012 A1 | 4/2010 | Adzic |
| 2010/0203287 A1 | 8/2010 | Jiang et al. |
| 2010/0245971 A1* | 9/2010 | Sotzing ............... D03D 15/292 359/265 |
| 2010/0252241 A1 | 10/2010 | McDermott et al. |
| 2010/0266788 A1 | 10/2010 | Niccolls et al. |
| 2010/0266790 A1 | 10/2010 | Kusinski et al. |
| 2010/0294475 A1 | 11/2010 | Rush |
| 2011/0039972 A1 | 2/2011 | Bauer |
| 2011/0198059 A1 | 8/2011 | Gavillet et al. |
| 2011/0253007 A1 | 10/2011 | Zastrau et al. |
| 2012/0141777 A1 | 6/2012 | Idemoto et al. |
| 2012/0231290 A1 | 9/2012 | Ho et al. |
| 2012/0328505 A1 | 12/2012 | Frei et al. |
| 2013/0074528 A1 | 3/2013 | Graaf et al. |
| 2013/0244001 A1 | 9/2013 | Wang et al. |
| 2013/0294002 A1* | 11/2013 | Thompson ............. B32B 5/026 361/212 |
| 2013/0330501 A1 | 12/2013 | Aizenberg et al. |
| 2014/0011013 A1 | 1/2014 | Jin et al. |
| 2014/0017456 A1 | 1/2014 | Xiao et al. |
| 2014/0178641 A1 | 6/2014 | Leblanc et al. |
| 2014/0182790 A1 | 7/2014 | Hwang et al. |
| 2014/0208978 A1 | 7/2014 | Sunder et al. |
| 2014/0231052 A1 | 8/2014 | Takasawa et al. |
| 2014/0238646 A1 | 8/2014 | Enright |
| 2014/0247556 A1 | 9/2014 | Eid et al. |
| 2014/0356574 A1 | 12/2014 | Conolly et al. |
| 2015/0175317 A1 | 6/2015 | Imai et al. |
| 2016/0068703 A1 | 3/2016 | Schmidt et al. |
| 2016/0097606 A1 | 4/2016 | Xiao et al. |
| 2017/0282416 A1 | 10/2017 | Kim et al. |
| 2019/0011074 A1 | 1/2019 | Fuller et al. |
| 2019/0058177 A1 | 2/2019 | Herle |
| 2019/0088981 A1 | 3/2019 | Chen et al. |
| 2019/0169444 A1* | 6/2019 | Gangakhedkar ...... C23C 16/405 |
| 2020/0000640 A1* | 1/2020 | Mondal ............. A61F 13/00063 |

FOREIGN PATENT DOCUMENTS

| | | |
|---|---|---|
| CN | 103173832 A | 6/2013 |
| CN | 104451814 A | 3/2015 |
| CN | 105776125 A | 7/2016 |
| CN | 105776317 A | 7/2016 |
| CN | 107171018 A | 9/2017 |
| EP | 2752504 B1 | 4/2016 |
| KR | 10-2019-0033143 A | 3/2019 |
| TW | 201914084 A | 4/2019 |
| TW | 201927996 A | 7/2019 |
| WO | 2014/012052 A1 | 1/2014 |
| WO | 2017/031391 A1 | 2/2017 |
| WO | 2018/053452 A1 | 3/2018 |
| WO | 2018/053453 A1 | 3/2018 |
| WO | 2018/132519 A1 | 7/2018 |
| WO | 2019036137 | 2/2019 |

OTHER PUBLICATIONS

Miljkovic, N., et al., Jumping-Droplet-Enhanced Condensation on Scalable Superhydrophobic Nanostructured Surfaces, 2013, Nano Lett. 13:179-187.

(56) References Cited

OTHER PUBLICATIONS

Miljkovic, N., et al., Modeling and Optimization of Superhydrophobic Condensation, 2013, J. Heat Transf.-Trans. ASME 135:14.

Miljkovic, N., et al., Condensation heat transfer on superhydrophobic surfaces, 2013, MRS Bull. 38:397-406.

Aili, A., et al., Characteristics of Jumping Droplet-Enhanced Condensation on Nanostructured Micromesh Surface, 2016, ASME International Conference on Micro/Nanoscale Heat and Mass Transfer, V001T004A001.

Kang, S.M., et al., Directional Oil Sliding Surfaces with Hierarchical Anisotropic Groove Microstructures, Aug. 5, 2013, Adv. Mater. 25(40):5756-5761.

Tuteja, A., et al., Design Parameters for Superhydrophobicity and Superoleophobicity, Jan. 1, 2011, MRS Bulletin 33 (8):752-758.

Lv, Y., et al., Fabrication of Superhydrophobic Films on Aluminum Foils with Controllable Morphologies, Jan. 11, 2013, Adv. Mat. Res., 641-642:414-417.

Mozalev, A., et al., The superhydrophobic properties of self-organized microstructured surfaces derived from anodically oxidized Al/Nb and Al/Ta metal layers, 2012, Electrochimica Acta 82:90-97.

Wang, Z., et al., In situ growth of hierarchical boehmite on 2024 aluminum alloy surface as superhydrophobic materials, 2014, RSC Adv. 4:14708-14714.

Zhao, J., et al., CoMn-layered double hydroxide nanowalls supported on carbon fibers for high-performance flexible energy storage devices, 2013, J. Mater. Chem. A, 1:8836-8843.

Gao, L., et al., High-performance energy storage devices based on WO3 nanowire arrays/carbon cloth interated electrodes, 2013, J. Mater. Chem. A, 1:7167-7173.

Liu, J., et al., Layered Double Hydroxide Nano- and Microstructures Grown Directly on Metal Substrates and Their Calcined Products for Application as Li-Ion Battery Electrodes, 2008, Adv. Funct. Mater. 18:1448-1458.

Zhang, F., et al., Corrosion Resistance of the Superhydrophobic $Mg(OH)_2$/Mg—Al Layered Double Hydroxide Coatings on Magnesium Alloys, 2016, Metals 6:85.

Liu, J., et al., Facile and Large-Scale Production of ZnO/Zn—Al Layered Double Hydroxide Hierarchical Heterostructures, 2006, Phys. Chem. B 110: 21865-21872.

Chen, H. et al., In Situ Microstructure Control of Oriented Layered Double Hydroxide Monolayer Films with Curved Hexagonal Crystals as Superhydrophobic Materials, 2006, Adv. Mater. 18:3089-3093.

* cited by examiner

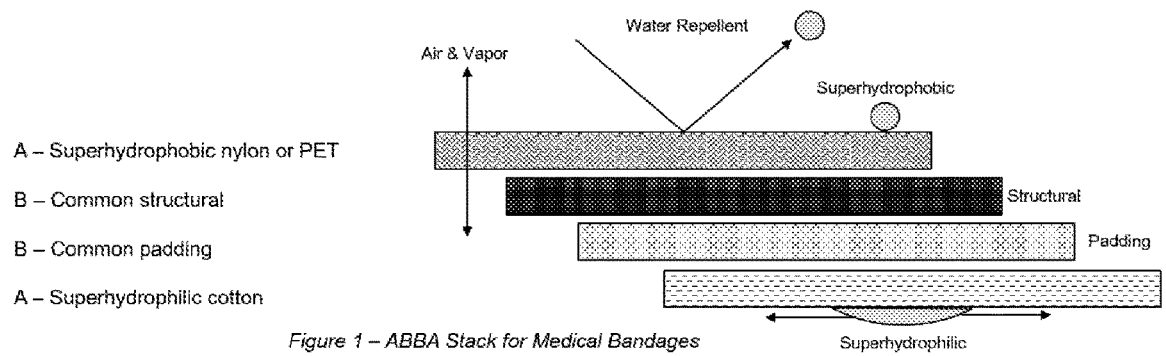
Figure 1 – ABBA Stack for Medical Bandages
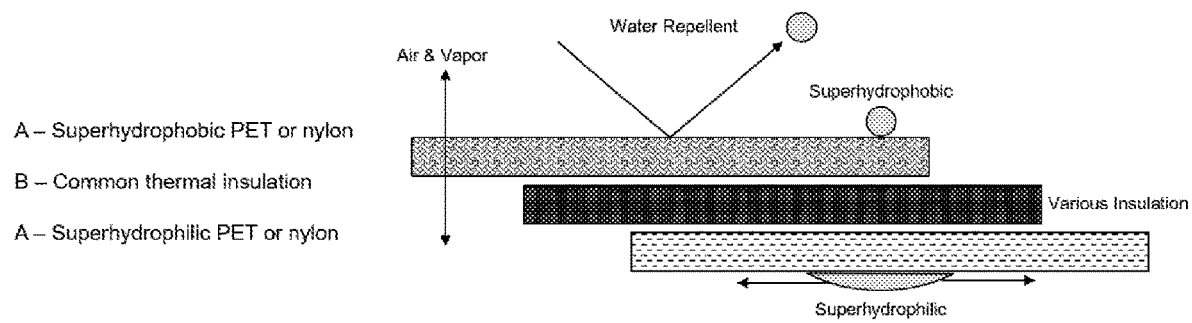
Figure 2 – ABA Stack for Performance Outerwear Apparel

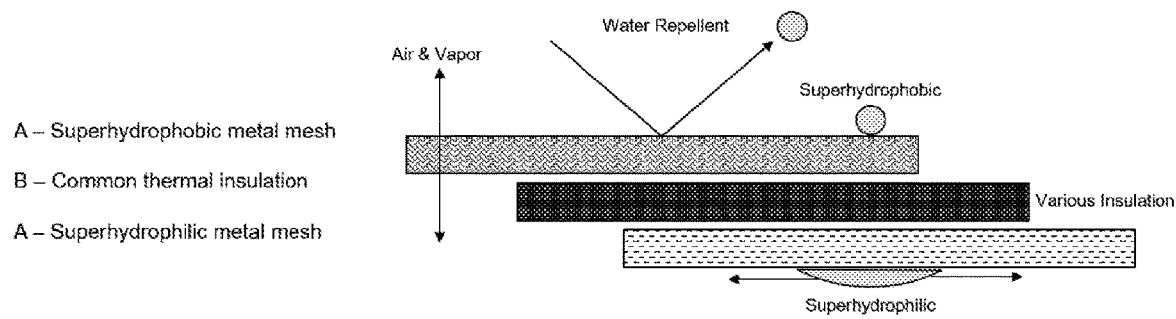
Figure 3 – ABA Stack for Hot Pipe Insulation
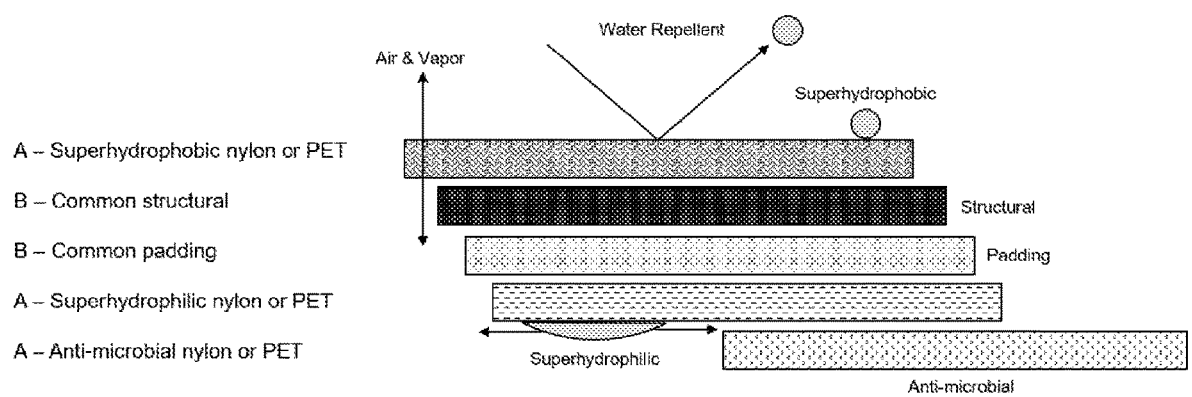
Figure 4 – ABBAA Stack for Medical Casts

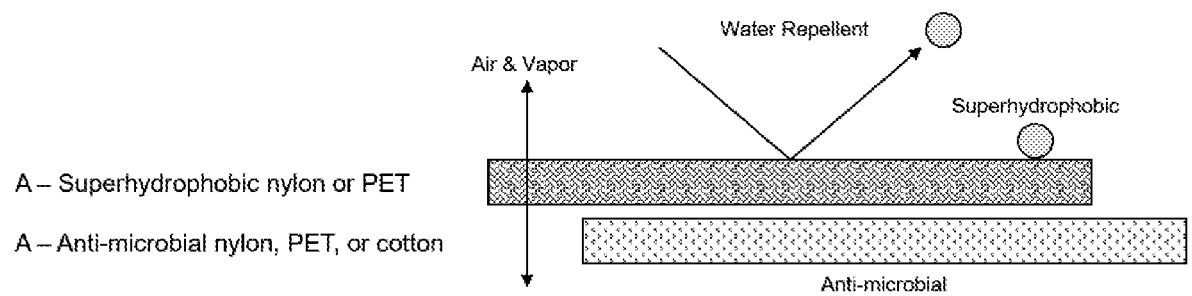
Figure 5 – AA Stack for Surgical Gowns

ASSEMBLIES OF FUNCTIONALIZED TEXTILE MATERIALS AND METHODS OF USE THEREOF

CROSS-REFERENCE TO RELATED APPLICATIONS

This application is a U.S. National Phase application under 37 CFR § 371 of PCT Application No. PCT/US2020/064395, filed on Dec. 11, 2020, which claims priority to PCT Application No. PCT/US2019/065978, filed on Dec. 12, 2019, and claims the benefit of U.S. Provisional Application No. 62/989,092, filed on Mar. 13, 2020, 62/989,150, filed on Mar. 13, 2020, 63/038,642, filed on Jun. 12, 2020, 63/038,693, filed on Jun. 12, 2020, and 63/039,965, filed on Jun. 16, 2020, all of which are incorporated herein by reference in their entireties.

FIELD OF THE INVENTION

The invention relates to the functionalization of a textile surface with a ceramic surface modification material, in particular, a binderless ceramic, such as a metal oxide and/or metal hydroxide ceramic, or a conversion coating, on the textile surface, and assemblies of layers of such materials to provide functional benefits in comparison to individual or unfunctionalized layers.

BACKGROUND

The functionalization of textile surfaces provides desired benefits in terms of textile performance, relative to unfunctionalized textile layers. Assemblies of layers that can provide multiple beneficial properties to a single system or article are desirable and can provide additional benefits when compared to individual functional layers or to assemblies of unfunctionalized layers. Furthermore, desirable performance characteristics may be enhanced through the integration of individual functional layers to form an assembly.

BRIEF SUMMARY OF THE INVENTION

Assemblies of functional and structural layers of materials, and/or layers that possess other beneficial properties, are provided. Functional layers may include ceramic material on a substrate, such as a textile substrate.

In one aspect, an assembly of materials is provided that includes a top surface and a bottom surface, wherein the assembly includes: (a) x $A_t$ layers of material comprising one or more functional properties, wherein the $A_t$ layers comprise a topmost layer that comprises the top surface;(b) y $A_b$ layers of material comprising one or more functional properties, wherein the $A_b$ layers comprise a bottommost layer that comprises the bottom surface; and (c) z B layers of insulating, structural or otherwise functionally beneficial material between x $A_t$ layers and y $A_b$ layers, wherein x, y, and z are the same or different number of layers, wherein the $A_t$ layers and/or the $A_b$ layers may each include a ceramic material, such as a binderless ceramic, e.g., a binderless porous ceramic material, on a substrate, and wherein the ceramic material on each $A_t$ layer and/or each $A_b$ layer is the same or different. In one embodiment, at least one $A_t$ layer includes a ceramic material, such as a binderless ceramic, e.g., a binderless porous ceramic material, on a substrate. In another embodiment, at least one $A_b$ layer includes a ceramic material, such as a binderless ceramic, e.g., a binderless porous ceramic material, on a substrate. In a further embodiment, at least one $A_t$ layer and at least one $A_b$ layer each includes a ceramic material, such as a binderless ceramic, e.g., a binderless porous ceramic material, on a substrate. In some embodiments, the top surface and/or the bottom surface includes a ceramic material, such as a binderless ceramic, e.g., a binderless porous ceramic material. In some embodiments, an $A_b$ layer and/or an $A_t$ layer includes multiple functional (e.g., aesthetic and/or performance related) properties.

In another aspect, an assembly of materials is provided that includes a top surface and a bottom surface, wherein the assembly includes: (a) x A layers of material comprising one or more functional properties, wherein the A layers comprise a topmost layer that comprises the top surface, wherein the A layers each comprise a ceramic material, such as a binderless ceramic, e.g., a binderless porous ceramic material, on a substrate; and (b) z B layers of insulating, structural, or otherwise functionally beneficial material, wherein the B layers comprises a bottommost layer that comprises the bottom surface, and wherein x and z are the same or different number of layers. In some embodiments, the assembly does not include an $A_b$ layer.

In another aspect, an assembly of materials is provided that includes a top surface and a bottom surface, wherein the assembly includes: (a) x $A_t$ layers of material comprising one or more functional properties, wherein the $A_t$ layers comprise a topmost layer that comprises the top surface; and (b) y $A_b$ layers, of material comprising one or more functional properties, wherein the $A_b$ layers comprise a bottommost layer that comprises the bottom surface, wherein the $A_t$ layers and the $A_b$ layers each comprise a ceramic material, such as a binderless ceramic, e.g., a binderless porous ceramic material on a substrate, wherein the ceramic material on the $A_t$ layers is different from the ceramic material on the $A_b$ layers, and wherein x and y are the same or different. In some embodiments, the assembly does not include a B layer. In one embodiment, at least one $A_t$ layer includes a ceramic material, such as a binderless ceramic, e.g., a binderless porous ceramic material, on a substrate. In another embodiment, at least one $A_b$ layer includes a ceramic material, such as a binderless ceramic, e.g., a binderless porous ceramic material, on a substrate. In a further embodiment, at least one $A_t$ layer and at least one $A_b$ layer each includes a ceramic material, such as a binderless ceramic, e.g., a binderless porous ceramic material, on a substrate. In some embodiments, the top surface and/or the bottom surface includes a ceramic material, such as a binderless ceramic, e.g., a binderless porous ceramic material. In some embodiments, an $A_b$ layer and/or an $A_t$ layer includes multiple functional (e.g., aesthetic and/or performance related) properties.

In some embodiments, the ceramic material is primarily crystalline. In some embodiments, the ceramic material includes a metal oxide, a hydrate of a metal oxide, a metal hydroxide, and/or a hydrate of a metal hydroxide. In some embodiments, the ceramic material includes a metal hydroxide, and at least a portion of the metal hydroxide includes layered double hydroxide. In some embodiments, the ceramic is a structured ceramic, such as a nanostructured ceramic.

In some embodiments, the ceramic material includes a mixed metal oxide, a hydrate of a mixed metal oxide, a mixed metal hydroxide, and/or a hydrate of a mixed metal hydroxide. In some embodiments, the ceramic material includes mixed a metal hydroxide, and at least a portion of the metal hydroxide includes a layered double hydroxide.

In some embodiments, the ceramic material includes a chemical conversion of a mixed metal oxide, a hydrate of a mixed metal oxide, a mixed metal hydroxide, and/or a hydrate of a mixed metal hydroxide. In some embodiments, the ceramic material includes a mixed metal hydroxide, and at least a portion of the metal hydroxide includes layered double hydroxide where intercalated ions have been exchanged (e.g., the intercalated metal ion that was in the layered double hydroxide as originally produced has been exchanged for a different intercalated ion).

In some embodiments, the substrate for at least one $A_t$ and/or at least $A_b$ layer includes a synthetic or natural textile that is woven, non-woven, or knit, or a metal mesh, metal screen, or metal cloth. In some embodiments, the substrate for at least one $A_t$ and/or at least one $A_b$ layer includes a synthetic or natural material film or polymer.

In some embodiments, each $A_t$ and/or $A_b$ layer includes one or more functional property selected from: ice or condensate management, anti-ice, anti-frost, superhydrophobicity, superhydrophilicity, inhibition of or resistance to microbial growth, corrosion resistance, electromagnetic modulation, thermal modulation, flame retardancy, breathability, dynamic wind resistance, color, absorption, barrier, maintenance properties (e.g., colorfastness, resistance to degradation, for example, during washing, ease of cleaning, wrinkle resistance, odor resistance), aesthetic properties (e.g., color reflectivity, finish (e.g., matte, opalescent), depth of color (e.g., color changes as function of angle of observation)), odor control, abrasion resistance, mechanical properties (e.g., stiffness, tensile strength (e.g., resistance to tearing), impact resistance), surface friction, handfeel, durability or a combination thereof.

In some embodiments, x and/or y is greater than 1, and each $A_t$ and/or $A_b$ layer includes at least one different functional property than other $A_t$ and/or $A_b$ layers. In some embodiments, each $A_t$ layer includes at least one different functional property from other $A_t$ layers. In other embodiments, each $A_b$ layer includes at least one different functional property from other $A_b$ layers. In other embodiments, $A_t$ layers include different functional properties than $A_b$ layers.

In some embodiments, the topmost layer that includes the top surface (topmost $A_t$ layer) and the bottommost layer that includes the bottom surface (bottommost $A_b$ layer) have the same functional properties. In some embodiments, the topmost layer that includes the top surface (topmost $A_t$ layer) and the bottommost layer that comprises the bottom surface (bottommost $A_b$ layer) have different functional properties.

In some embodiments, each B layer includes one or more structural property selected from: thermal resistance, electrical resistance, structural support, mechanical padding, aesthetics, comfort, protective, durability, maintenance properties (e.g., fast drying, ease of folding, colorfastness, resistance to degradation, for example, during washing, ease of cleaning, wrinkle resistance), fluid transfer characteristics, or a combination thereof. In some embodiments, one or more B layer includes a ceramic material, for example, selected from glass fiber, loose ceramics, and other inorganic materials.

In some embodiments of the assemblies herein, at least one A layer (e.g., at least one $A_t$ and/or $A_b$ layer) includes a functional material (e.g., surface functionality top coat material) applied to or deposited on the ceramic material that imparts or enhances one or more functional property. In some embodiments, at least one functional property imparted by these functional materials is of greater magnitude than the same functional property imparted by an identical surface functionality top coat material deposited directly on an identical substrate that does not comprise the ceramic material. In some embodiments of the assemblies herein, at least one A layer (e.g., at least one $A_t$ and/or $A_b$ layer) includes a functional material (e.g., surface functionality top coat material), and the ceramic material and the functional material synergistically impart one or more functional property that is of greater magnitude than the same functional property imparted by either the ceramic material or the top coat material deposited independently on an identical textile surface.

In some embodiments, the functional layer imparts a hydrophobic property. For example, the functional layer that imparts a hydrophobic property to the composition may include a fluoropolymer, an elastomer, a plastic, or a molecule with a head group and a tail group head group and a tail group, for example, wherein the head group includes a silane group, a phosphonate group, a phosphonic acid group, a carboxylic acid group, a vinyl group, an alcohol group, a hydroxide group, a thiolate group, a thiol group, and/or an ammonium group (e.g., a quaternary ammonium group), and wherein the tail group includes a hydrocarbon group, a fluorocarbon group, a vinyl group, a phenyl group, an epoxide group, an acrylic group, an acrylate group, a hydroxyl group, a carboxylic acid group, a thiol group, and/or a quaternary ammonium group.

In some embodiments of the assemblies herein, the binderless ceramic material on at least one A layer (e.g., at least one $A_t$ and/or at least one $A_b$ layer) is a partially filled porous structure. For example, the pores of the ceramic material may be filled with a second ceramic material or with a molecule with a head group and a tail group.

In some embodiments of the assemblies herein, at least one A layer (e.g., at least one $A_t$ layer and/or at least one $A_b$ layer) can withstand a hydrostatic pressure greater than about 1 kPa.

In some embodiments of the assemblies herein at least one A layer (e.g., at least one $A_t$ layer and/or at least one $A_b$ layer) includes a moisture vapor transmission rate greater than about 80% of the vapor transmission rate of an identical substrate that is not modified with the ceramic material (and in some embodiments optional functional layer).

In some embodiments of the assemblies herein, at least one A layer (e.g., at least one $A_t$ layer and/or at least one $A_b$ layer) includes a sessile drop water contact angle greater than about 150 degrees.

In some embodiments of the assemblies herein, at least one A layer (e.g., at least one $A_t$ and/or $A_b$ layer) improves the aesthetics, wearer comfort, durability or maintenance of desirable properties. (See, e.g., Venkatraman, P., "Fabric Properties and Their Characteristics, in Materials and Technology for Sportswear and Performance Apparel," 2015, CRC Press, ISBN 9781482220513.)

In some embodiments, the assembly is incorporated into performance outerwear apparel, a medical bandage, a medical cast, a surgical gown, filtration or separation media, packing material, hospital bedding, absorptive textiles, a protective mask, protective apparel, an architectural textile, or a geo-textile.

In some embodiments, a pipe insulation or pipe protection material is provided that includes an assembly as described herein, wherein one or more $A_t$ layer includes a hydrophobic or superhydrophobic functional property, wherein one or more B layer includes a thermal insulating, protective (e.g., protection from corrosion and/or abrasion of the pipe under operating conditions or in the environment of use, and/or protection from injury to an individual in proximity to the pipe), or structural property, and wherein one or more $A_b$ layer includes a hydrophilic or superhydrophilic functional property. For example, the pipe insulation or pipe protection material may surround a pipe, wherein the bottommost $A_b$ layer is in contact with the pipe, and wherein the topmost $A_t$ layer is in contact with the ambient environment. One or more $A_t$ and/or $A_b$ layer may include a ceramic coated woven material. For example, the woven material may be selected from a stainless steel alloy woven material, a carbon steel alloy woven material, an aluminum alloy woven material, and a textile. In some embodiments, at least one B layer may include a material selected from fiberglass, silicon carbide (e.g., carborundum), ceramic fiber insulation, silicone or silicone foam, mineral wool, basalt, cellular glass, polyimide, calcium silicate, or silica. A pipe, section of pipe, or section of reactor (such as a bioreactor, adsorption bed, catalytic reactor, or distillation column) surrounded by an insulation, protective, or performance material as described herein, is also provided.

In some embodiments, a textile material is provided that includes an assembly as described herein, wherein one or more $A_t$ layer includes a hydrophobic or superhydrophobic functional property, wherein one or more B layer includes a thermal insulating, protective, or structural property, and wherein one or more $A_b$ layer includes a hydrophilic or superhydrophilic functional property. In some embodiments, the substrate of one or more $A_t$ and/or $A_b$ layer includes a woven material. For example, the woven material may be selected from a textile, a polyamide, a polyester, a cellulosic material, cotton, wool, a polymer film, a stainless steel alloy woven material, and an aluminum alloy woven material. In some embodiments, the substrate of one or more $A_t$ and/or $A_b$ layer includes nylon or polyethylene terephthalate (PET). In some embodiments, one or more B layer includes a material selected from polyester, fleece, wool, feathers, down, and other primarily organic materials.

BRIEF DESCRIPTION OF THE DRAWINGS

FIG. 1 shows an exemplary embodiment of an assembly of layers of materials for use in a medical bandage.

FIG. 2 shows an exemplary embodiment of an assembly of layers of materials for use in performance outerwear apparel.

FIG. 3 shows an exemplary embodiment of an assembly of layers of materials for use in pipe insulation.

FIG. 4 shows an exemplary embodiment of an assembly of layers of materials for use in a medical cast.

FIG. 5 shows an exemplary embodiment of an assembly of layers of materials for use in medical/surgical apparel.

DETAILED DESCRIPTION

Assemblies of stacked layers of materials are described, and methods and applications of use thereof. The assemblies described herein include one or more functional ("A") layers and optionally, one or more structural or bulk property ("B") layers. The functional layers include a structured ceramic on a substrate material, which may provide desirable functional properties and/or which may be further functionalized by application or deposit of an additional surface chemistry top coat material, to provide desirable properties for a particular application of use. At least a portion of the substrate surface undergoes a chemical conversion to provide a structured (e.g., nanostructured) ceramic material, and an optional subsequent process provides additional functionalization of the ceramic. Layers may be arranged to impart functional properties in a directional manner, such as movement of vapor or thermal energy in a direction toward an ambient exposed surface. Layers may be arranged to impart functional properties in a combinatorial manner, such as an abrasion resistant layer and an insulating layer to provide both mechanical and thermal protection.

The A layers include a structured ceramic on a substrate surface, and optionally, a surface functional top coat, to provide one or more functional properties to the substrate. Ceramic, e.g., porous ceramic (e.g., metal oxide and/or metal hydroxide) surface modification compositions are deposited on a textile or fabric substrate surface. The compositions are provided as binderless surface modification material on the surface of the substrate, for example, a surface-immobilized ceramic material. In some embodiments, the ceramic material includes a metal oxide and/or hydroxide ceramic, for example, a single metal or mixed metal oxide and/or hydroxide ceramic. In some embodiments, the ceramic material includes a metal oxide and a metal hydroxide ceramic, wherein the metal oxide and the metal hydroxide include the same or different single metal or mixed metals. In some embodiments, the ceramic material includes a metal oxide and/or a metal hydroxide ceramic, wherein the substrate is hydrated by water or other compounds resulting in a change of surface energy and potentially the ratio of metal oxide to metal hydroxide composition of the ceramic. In some embodiments, the ceramic material includes a metal hydroxide, wherein at least a portion of the metal hydroxide is in the form of a layered double hydroxide, e.g., at least about 5%, 10%, 15%, 20%, 25%, 30%, 35%, 40%, 45%, 50%, 55%, 60%, 65%, 70%, 75%, 80%, 85%, 90%, or 95% of the metal hydroxide is layered double hydroxide. In some embodiments, the intercalated ions of the layered double hydroxide may have been exchanged to impart additional benefit. In some embodiments of the compositions described herein, a "metal oxide" or "metal hydroxide" may be in the form of a hydrate of a metal oxide or metal hydroxide, respectively, or a portion of the metal oxide or metal hydroxide may be in the form of a hydrate of a metal oxide or metal hydroxide, respectively.

A mixed metal oxide or mixed metal hydroxide may include, for example, oxides or hydroxides, respectively, of more than one metal, such as, but not limited to, iron, cobalt, nickel, copper, manganese, chromium, titanium, vanadium, zirconium, molybdenum, tantalum, zinc, lead, tin, tungsten, cerium, praseodymium, samarium, gadolinium, lanthanum, magnesium, aluminum, or calcium.

The surface modification materials (e.g., binderless porous ceramic materials) herein are deposited onto a substrate (e.g., produced by reaction with a metal on the substrate surface) without a binder. In some embodiments, a surface modification material as described herein is immobilized on the substrate.

In some embodiments, the structured ceramic material is a nanostructured ceramic material.

In some embodiments, the structured ceramic material is subjected to an additional chemical conversion process resulting in a modified structured (e.g., nanostructured) ceramic material.

Nonlimiting examples of binderless ceramic surface modification materials are provided in PCT Application No. PCT/US19/65978, which is incorporated by reference herein in its entirety.

Definitions

Numeric ranges provided herein are inclusive of the numbers defining the range.

"A," "an" and "the" include plural references unless the context clearly dictates otherwise.

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc."

"Binder" or binding agent is any material or substance that holds or draws other materials together to form a cohesive whole mechanically, chemically, by adhesion or cohesion.

"Binderless" refers to absence of a binder, particularly with regard to an organic binder or resin (e.g., polymers, glues, adhesives, asphalt) or inorganic binder (e.g., lime, cement glass, gypsum, etc.).

A "capping agent" refers to a compound or agent that slows crystal growth and permits modulation of the morphology of the nanosurface.

"Ceramic" refers to a solid material comprising an inorganic compound of metal, non-metal, or ionic and covalent bonds.

A "conversion coating" refers to a surface layer in which reactants are chemically reacted with the surface to be treated that converts the substrate into a different compound. This process is typically not additive or a deposition.

"Fabric" refers to a nonwoven material that may be constructed from fibers, and bonded together by chemical, mechanical, heat, and/or solvent treatment. Fabric may include, for example, felt, and other materials that are neither woven nor knitted.

A "fiber" refers to a thread or filament from which a textile is formed

"Hydrophilic" refers to a surface that has a high affinity for water. Contact angles can be very low and/or immeasurable.

A "layer" refers to a sheet, quantity, or thickness of material, typically one of several, covering a surface or body, or freestanding, e.g., supported by one or more support structure.

"Layered double hydroxide" refers a class of ionic solids characterized by a layered structure with the generic sequence $[AcB \, Z \, AcB]_n$, where c represents layers of metal cations, A and B are layers of hydroxide anions, and Z are layers of other anions and/or neutral molecules (such as water). Layered double hydroxides are also described in PCT Application No. PCT/US2017/052120, which is incorporated by reference herein.

A "nanostructured" composition refers herein to a composition that has a feature in at least one dimension that is less than 100 nanometers.

"Permeability" in fluid mechanics is a measure of the ability of a porous material to allow fluids to pass through it. The permeability of a medium is related to the porosity, but also to the shapes of the pores in the medium and their level of connectedness.

"Pore size distribution" refers to the relative abundance of each pore diameter or range or pore diameters as determined by mercury intrusion porosimetry (MIP) and Washburn's equation.

"Porosity" is a measure of the void (i.e., "empty") spaces in a material, and is a fraction of the volume of voids over the total volume, between 0 and 1, or as a percentage between 0% and 100%. Porosity may be measured by mercury intrusion porosimetry.

"Porous" refers to spaces, holes, or voids within a solid material.

"Superhydrophilic" refers a surface that has excess hydrophilicity, or attraction to water. The contact angle of water on a superhydrophilic material is equal to zero degrees.

"Superhydrophobic" refers to a surface that is extremely difficult to wet. The contact angle of a water droplet on a superhydrophobic material here a superhydrophobic surface refers to contact angles >150°. Highly hydrophobic contact angles are >120°.

"Surface area per square meter of projected substrate area" refers to the actual measured surface area, usually measured in square meters, divided to the surface area of the substrate if it were atomically smooth (no surface roughness), also typically in square meters.

"Synergy" or "synergistic" refers to the interaction or cooperation between two or more substances, materials, or agents to produce a combined effect that is greater (positive synergy) or lesser (negative synergy) than the sum of theft separate, individual effects.

"Textile" refers to a flexible material consisting of a network of natural or artificial fibers. For example, a textile material may be created by joining fibers or groups of fibers through knitting, weaving, felting, tufting, or bonding, where fiber encompasses both natural and synthetic forms of all lengths including metal fibers. Textiles also include ropes and cords.

"Thickness" refers to the length between the surface of the substrate and the top of the surface modification (e.g., ceramic) material.

"Top coat" refers to a material or chemical treatment in which surfaces and chemicals interact, bond or disperse to form a modified surface through changes in surface energy, microbial resistance, color, thermal properties, electrical properties, or reactivity. Property changes may be realized at the atomic, molecular, feature or overall part length scale.

"Tunable" refers to the ability of a function, characteristic, or quality of a material to be changed or modified.

"Vapor transmission rate" refers to the mass of vapor per unit area per unit time that passes through a layer in the direction orthogonal to the plane of the layer.

"Water column breakthrough pressure" refers to the specific height of a vertical column of water at which the hydrostatic pressure experienced by the layer at the bottom of the water column overcomes the ability of the layer to support the water column resulting in the water flowing through the layer.

Assemblies of Materials

Assemblies of layers of materials are disclosed herein. The layers are generally configured in a stack, with a top surface at the top of the stack and a bottom surface at the bottom of the stack. The top surface is generally in contact with the ambient environment in which the assembly is situated or used (e.g., air). The bottom surface may be in contact with or in proximity to a device, surface, or individual with which the assembly is used, for example, a device or surface to be protected, or for comfort of an individual in a particular ambient environment of use.

The stacks of layers include materials that include a ceramic (e.g., a binderless ceramic, such as a binderless porous ceramic material) on a substrate (designated "A" layers herein). The A layers impart desirable functional properties to the assembly. For example, the ceramic material may impart one or more properties selected from selected from hydrophobicity, inhibition of microbial growth, flame retardancy, hydrophilicity, resistance to corrosion, ice or condensate management, anti-ice, anti-frost, superhydrophobicity, superhydrophilicity, inhibition of microbial growth, corrosion resistance, electromagnetic modulation, thermal modulation, breathability, dynamic wind resistance, and/or color, or a combination thereof. Some embodiments of the assemblies herein include a top A layer that includes the top surface of the assembly (facing the ambient environment) and a bottom A layer that includes the bottom surface of the assembly (facing a device, surface, or individual with which the assembly is used). A binderless porous ceramic material as described herein is on each of the top and bottom surfaces. The binderless porous ceramic material on each A layer may be the same or different from each other A layer in the assembly.

Some stacks of layers include one or more "B" layers that include structural and/or insulating material, between one or more A layers at the top of the stack ("$A_t$" layers) and one or more A layers at the bottom of the stack ("$A_b$" layers). In some embodiments, the assembly includes one B layer with structural and/or insulating material. In other embodiments, the assembly includes two or more B layers with structural and/or insulating material, and each B layer may be constructed of the same or different material or composition as each other B layer in the assembly.

In some embodiments, the assembly includes one $A_t$ layer and one $A_b$ layer, and the $A_t$ layer may be constructed of the same or different material or composition (e.g., same or different substrate and/or ceramic composition) as the $A_b$ layer. In some embodiments, the assembly includes two or more $A_t$ layers (i.e., a plurality of $A_t$ layers) and/or two or more $A_b$ layers (i.e., a plurality of $A_b$ layers), and each $A_t$ layer and/or each $A_b$ layer may be constructed of the same or different material or composition (e.g., same or different substrate and/or ceramic composition) as each other A layer (i.e., each other $A_t$ and/or $A_b$ layer).

In some embodiments, at least one A layer of the assembly (e.g., at least one $A_t$ and/or $A_b$ layer) imparts one or more functional property to the assembly, for example, selected from ice or condensate management (resistance to ice formation, or directing or putting in place materials that direct ice or condensate to form, collect, and travel in a desired manner), anti-ice performance or frost delay properties, superhydrophobicity (e.g., prevention of fouling by water ingression), superhydrophilicity (e.g., wicking of water away from a surface to minimize time or wetness and/or to prevent moisture related damage), anti-microbial modulation (inhibition, elimination, or prevention of microbial growth), corrosion resistance or prevention, electromagnetic modulation (change in an electromagnetic property, e.g., diffuse or specular emission, diffuse or specular reflection, adsorption, transmission), thermal modulation, flame retardancy, breathability (allows moisture vapor to be transported through the material), dynamic wind resistance (nonlinear response of vapor transmission to applied wind velocity), mechanical protection (abrasion or impact resistance) and color and/or other aesthetic properties, or a combination thereof.

In some embodiments, the $A_t$ layer that includes the top surface of the assembly and the $A_b$ layer that includes the bottom surface of the assembly impart different functional properties. In one embodiment, the $A_t$ layer that includes the top surface of the assembly is hydrophobic or superhydrophobic and the $A_b$ layer that includes the bottom surface of the assembly is hydrophilic or superhydrophilic. In another embodiment, the $A_t$ layer that includes the top surface of the assembly is hydrophobic or superhydrophobic and the $A_b$ layer that includes the bottom surface of the assembly is anti-microbial. In another embodiment, the $A_t$ layer that includes the top surface of the assembly is hydrophobic or superhydrophobic, the $A_b$ layer that includes the bottom surface of the assembly is anti-microbial, and an $A_b$ layer above the $A_b$ layer that includes the bottom surface of the assembly is hydrophobic or superhydrophobic.

In certain embodiments, a top coat material is deposited or applied onto the ceramic material, thereby imparting and/or enhancing one or more functional property as described herein to an A layer of the assembly. In some embodiments, the functionality imparted by the top coat material applied or deposited on the ceramic as described herein is enhanced relative to the functionality of the identical material applied or deposited on an identical substrate that does include the ceramic. In some embodiments, the ceramic material and the top coat material synergistically impart one or more functional property that is of greater magnitude than the same functional property imparted by either the ceramic material or the top coat material deposited independently on an identical substrate surface.

In some embodiments, a hydrophobic functionality is provided by a fatty acid, such as stearic acid, or Scotchgard™ (3M). In some embodiments, an anti-microbial functionality is provided by SmartShield Antimicrobial Protective Spray (Sylvane). In some embodiments, a flame retardancy functionality is provided by No Burn 1005 Fabric Fire Protection (No-Burn, Inc.) or a halon containing compound. In some embodiments, a hydrophilic functionality is provided by polyvinylpyrrolidone (PVP), polyurethane, polyacrylic acid (PAA), polyethylene oxide (PEO), or a polysaccharide material.

In certain nonlimiting embodiments, the top coat may include a paint, a paint binder, hydrophobic material, a hydrophilic material, a metal or metal-containing compound, pigments and/or coloring agents, or an antimicrobial agent.

In some embodiments, a top coat is a surface modifying top coating which reduces the viscous drag of an external or internal fluid on the surface. In some embodiments, a coating is deposited onto a surface that includes a nanostructured coating composition and a surface modifying top coating which reduces the viscous drag of an external or internal fluid on the surface and further includes additional benefits such as corrosion resistance, fouling resistance, self cleaning, heat transfer characteristics, optical characteristics, chemical inertness, other useful properties or combinations of properties.

In some embodiments, a top coat is or contains an antimicrobial agent. For example, an antimicrobial agent may be a charge transfer compound or agent that disrupts movement of ions across a cell membrane, for example, a quarternary amine. In some embodiments, the antimicrobial agent is a beta-lactam, an aminoglycoside, a tetracycline, a chloramphenicol, a macrolide, a lincosamide, a sulfonamide, a quinolone, a polyene, an azole, or a griseofulvin.

In some embodiments, a top coat is or contains a paint binder. For example, the paint binder may be an alkyd, an acrylic, a vinyl-acrylic, a vinyl acetate/ethylene (VAE), a polyurethane, a polyester, a melamine resin, an epoxy, a silane, or an oil.

In some embodiments, the ceramic surface modification material is a partially filled porous structure. For example, the pores may be partially filled with a second ceramic material (e.g., a ceramic material that is different from the ceramic material on the substrate surface) or with a molecule with a head group and a tail group, for example, wherein the head group includes a silane group, a phosphonate group, a phosphonic acid group, a carboxylic acid group, a vinyl group, an alcohol group, a hydroxide group, a thiolate group, a thiol group, and/or an ammonium group (e.g., a quaternary ammonium group), and wherein the tail group includes a hydrocarbon group, a fluorocarbon group, a vinyl group, a phenyl group, an epoxide group, an acrylic group, an acrylate group, a hydroxyl group, a carboxylic acid group, a thiol group, and/or a quaternary ammonium group.

In some embodiments, at least one B layer of the assembly imparts one or more structural and/or insulating property selected from thermal resistance, electrical resistance, structural support, mechanical padding, and fluid transfer, or a combination thereof. In some embodiments, at least one B layer of the assembly includes a ceramic material, such as glass fiber, loose ceramics, or other inorganic materials.

Binderless Ceramic

"A" layers in an layered assembly as described herein include a binderless porous ceramic material on a substrate. Nonlimiting examples of such ceramic materials are described in PCT/US19/65978, which is incorporated herein by reference in its entirety.

Substrates for the A layers of the assemblies (stacks) of layers of materials described herein are typically flexible materials suitable for the application of use for the assembly. In some embodiments, the substrate is a woven material, such as, but not limited to, a stainless steel alloy, carbon steel alloy, or aluminum alloy woven material. In some embodiments, the substrate is a textile, a polymer (e.g., polyamide, polyester), a cellulosic material, a natural material (e.g., cotton, wool), or a synthetic material (e.g., nylon, PET). In some embodiments, the substrate includes a synthetic or natural fiber textile that is woven, non-woven, or knit. In some embodiments, the substrate includes metal mesh, metal screen, or metal cloth. In some embodiments, the substrate includes a natural or synthetic polymer films or substrates (e.g., a coating of thin (film) or thicker (substrate) polymer (e.g., plastic) materials that are not necessarily woven into a textile).

In some embodiments, the binderless ceramic material includes: a surface area of about 1.5 $m^2$ to 100 $m^2$, about 10 $m^2$ to about 1500 $m^2$, or about 70 $m^2$ to about 1000 $m^2$ per square meter of projected substrate area; a surface area of about 15 $m^2$ to about 1500 $m^2$, or about 50 $m^2$ to about 700 $m^2$ per gram of ceramic material; mean pore diameter of about 5 nm to about 200 nm, about 2 nm to about 20 nm, or about 4 nm to about 11 nm; thickness up to about 100 micrometers, up to about 50 micrometers, up to about 25 micrometers, up to about 20 micrometers, or about 0.2 micrometers to about 25 micrometers; a porosity of about 5% to about 95%, about 10% to about 90%, about 30% to about 70%, about 30% to about 95%, or greater than about 10%; a void volume of about 100 $mm^3$/g to about 7500 $mm^3$/g as determined by mercury intrusion porosimetry; or any combination thereof.

In some embodiments, the ceramic material (e.g., metal oxide, metal hydroxide, and/or hydrates thereof) includes one or more of zinc, aluminum, manganese, magnesium, cerium, copper, gadolinium, tungsten, tin, lead, and cobalt. In some embodiments, the ceramic material includes a transition metal, a Group II element, a rare-earth element (e.g., lanthanum, cerium gadolinium, praseodymium, scandium, yttrium, samarium, or neodymium), aluminum, tin, zinc, or lead.

In some embodiments, the binderless ceramic surface modification material includes a thickness of about 0.5 or 1 to about 100 micrometers, or about 0.5 micrometers to about 20 micrometers, or a thickness up to about 50 micrometers, or up to about 25 micrometers. In some embodiments, the binderless porous ceramic material includes a thickness of about 0.2 micrometers to about 25 micrometers. In some embodiments, the thickness is any of at least about 0.2, 0.5, 1, 2, 3, 4, 5, 6, 7, 8, 9, 10, 11, 12, 13, 14, 15, 16, 17, 18, 19, 20, 21, 22, 23, 24, or 25 micrometers. In some embodiments, the thickness is any of about 0.2 to about 0.5, about 0.5 to about 1, about 1 to about 5, about 3 to about 7, about 5 to about 10, about 7 to about 15, about 10 to about 15, about 12 to about 18, about 15 to about 20, about 18 to about 25, about 0.5 to about 15, about 2 to about 10, about 1 to about 10, about 3 to about 13, about 0.5 to about 15, about 0.5 to about 5, about 0.5 to about 10, or about 5 to about 15 micrometers.

In some embodiments, the binderless ceramic surface modification material includes a surface area of about 1.1 $m^2$ to about 100 $m^2$ per square meter of projected substrate area. In some embodiments, the binderless porous ceramic material includes a surface area of about 10 $m^2$ to about 1500 $m^2$ per square meter of projected substrate area. In some embodiments, the surface area is any of at least about 10, 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, or 1500 $m^2$ per square meter of projected substrate area. In some embodiments, the surface area is any of about 10 to about 100, about 50 to about 250, about 150 to about 500, about 250 to about 750, about 500 to about 1000, about 750 to about 1200, about 1000 to about 1500, about 70 to about 1000, about 150 to about 800, about 500 to about 900, or about 500 to about 1000 $m^2$ per square meter of projected substrate area.

In some embodiments, the binderless ceramic material includes a surface area of about 15 $m^2$ to about 1500 $m^2$ per gram of ceramic material. In some embodiments, the surface area is any of at least about 15, 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, or 1500 $m^2$ per gram of ceramic material. In some embodiments, the surface area is any of about 15 to about 100, about 50 to about 250, about 150 to about 500, about 250 to about 750, about 500 to about 1000, about 750 to about 1200, about 1000 to about 1500, about 50 to about 700, about 75 to about 600, about 150 to about 650, or about 250 to about 700 $m^2$ per gram of ceramic material.

In some embodiments, the binderless ceramic surface modification material is porous and includes mesoporous mean pore sizes that range from about 2 nm to about 50 nm. In other embodiments, the mean pore sizes range from about 50 nm to about 1000 nm. In some embodiments, the binderless porous ceramic material includes a mean pore diameter of about 2 nm to about 20 nm. In some embodiments, the mean pore diameter is any of at least about 2, 3, 4, 5, 6, 7, 8, 9, 10, 11, 12, 13, 14, 15, 16, 17, 18, 19, or 20 nm. In some embodiments, the mean pore diameter is any of about 2 to about 5, about 4 to about 9, about 5 to about 10, about 7 to about 12, about 9 to about 15, about 12 to about 18, about 15 to about 20, about 4 to about 11, about 5 to about 9, about 4 to about 8, or about 7 to about 11 nm.

In some embodiments, the binderless ceramic surface modification material is porous, with a porosity of about 5% to about 95%. In some embodiments, the porosity may be any of at least about or greater than about 5%, 10%, 15%, 20%, 25%, 30%, 35%, 40%, 50%, 55%, 60%, 65%, 70%, 75%, 80%, 85%, 90%, or 95%. In some embodiments, the porosity is about 10% to about 90%, about 30% to about 90%, about 40% to about 80%, or about 50% to about 70%.

In some embodiments, the binderless porous surface modification material is porous, with a permeability of about 1 to 10,000 millidarcy. In some embodiments, the permeability may be any of at least about 1, 10, 100, 500, 1000, 5000, or 10,000 millidarcy. In some embodiments, the permeability is about 1 to about 100, about 50 to about 250, about 100 to about 500, about 250 to about 750, about 500 to about 1000, about 750 to about 2000, about 1000 to about 2500, about 2000 to about 5000, about 3000 to about 7500, about 5000 to about 10,000, about 1 to about 1000, about 1000 to about 5000, or about 5000 to about 10,000 millidarcy.

In some embodiments, the binderless ceramic material is porous and includes a void volume of about 100 mm$^3$/g to about 7500 mm$^3$/g, as determined by mercury intrusion porosimetry. In some embodiments, the void volume is any of at least about 100, 200, 300, 400, 500, 600, 700, 800, 900, 1000, 1500, 2000, 2500, 3000, 3500, 4000, 4500, 5000, 5500, 6000, 6500, 7000, or 7500 mm$^3$/g. In some embodiments, the void volume is any of about 100 to about 500, about 200 to about 1000, about 400 to about 800, about 500 to about 1000, about 800 to about 1500, about 1000 to about 2000, about 1500 to about 3000, about 2000 to about 5000, about 3000 to about 7500, about 250 to about 5000, about 350 to about 4000, about 400 to about 3000, about 250 to about 1000, about 250 to about 2500, about 2500 to about 5000, or about 500 to about 4000 mm$^3$/g.

The ceramic deposit layer is designed to impart one or more functional characteristic to a layer of an assembly of materials as described herein and/or may be designed to provide a binding surface for a functionalizing top coat.

Methods of Making Ceramic Materials

A ceramic surface modification material, such as a binderless ceramic porous surface modification material, as described herein, may be produced by a method that includes dipping or otherwise contacting a clean substrate (e.g., textile substrate) with an aqueous solution with one or more metal salt(s) for an amount of time to achieve a desired thickness of a porous coating composition on the substrate. The solution may also contain a chelating or complex forming agent. pH, temperature, and deposition time (e.g., about 5 minutes to about 300 minutes) are suitable for the desired thickness, morphology, and surface porosity of the surface modification material to be produced. The pH of the solution may be adjusted across the range of 1 to 12 in order to adjust the characteristics (for example, desired crystal structure and/or surface porosity) of the surface modification by the addition of acidic or basic materials. The metal salt(s) may include, for example, salts of magnesium, aluminum, cerium, iron, cobalt, gadolinium, manganese, tungsten, zinc, vanadium, titanium, and/or tin. The salts may be metal cation salts with anions of, for example, sulfates, nitrates, chlorides, or acetates. In other embodiments, sodium cation salts are used with metal anions such as, for example, sodium stannate. In some embodiments, the metal salt concentration is about 1 mM to about 5M in the aqueous solution. In some embodiments, chelating or complex forming agent such as, for example, citric acid, urea, diamines, triamines, or tetramines, thioglycerol, oleic acid or other fatty acids, polyols, Tween 80 or other surfactants, is included at a concentration of about 1 mM to about 5M. pH control chemicals and buffering agents may be optionally included.

In some embodiments, the substrate is cleaned to remove loose and lightly adhered debris by washing and rinsing and a variety of metal cleaning solutions or cleaning solutions outlined for particular substrates. A variety of process conditions are acceptable for the successful removal of loose and lightly adhered debris.

In some embodiments, the substrate is processed using an alkaline based cleaning solution to saponify and remove fats and oils from the substrates. One example is the use of caustic soda in an aqueous solution with a pH of approximately 11 or greater. Other embodiments may use alternative means of degreasing such as vapor or solvent based methods or proprietary cleaners. A variety of process conditions are acceptable for the successful removal of surface fats and oils.

In some embodiments, the substrate is further prepared to homogenize the surface using known methods for treatment the surface through an alkaline etching of substrate materials. This process generates surface oxides and surface hydroxides, reaction products and intermetallic materials, some of which are insoluble in the etch solution and must be removed from the substrate by rinsing, mechanical means or by a process known in the industry as desmutting. Desmutting or deoxidizing solutions typically include acid solutions such as chromic, sulphuric, nitric or phosphoric acids or combinations therein. Ferric sulfate solutions may be employed. The desmutting solutions remove the reaction products, oxides, hydroxides, and intermetallic materials by solubilizing or mechanical removal (e.g., silicon containing particles). Many proprietary surface preparation materials are available. Other surface preparation options such as acid etching, electropolishing, ultrasonic treatment, or other surface finishing treatment preparatory methods that remove substrate oxides, hydroxides, reaction products, and intermetallic compounds, may be successfully employed. A variety of process conditions are acceptable for the successful surface preparation of the substrate and removal of smut.

In other embodiments, alternative surface preparation for subsequent processing includes exposure to a strong oxidizer, such as persulfate, hypochlorite, permanganate, oxidizing acids, UV/Ozone, or oxygen plasma, to activate the substrate.

In some embodiments, the substrate is processed using one or more processing steps in which the substrate reacts with the processing baths to form the nanostructured materials. The solutions described herein are aqueous based and include metal salt of about 1 mM to about 5M in the aqueous solution and/or chelating or complex forming agents such as polyols, polyethers, urea, secondary and higher amines, diamines, triamines, or tetraamines, at a concentration of about 1 mM to about 5M. Process conditions, not including hydrostatic pressures for differing tank depths, range from 65 to 200 kPa, and temperatures spanning the liquid phase equilibrium for these solutions which range from −20° C. to 190° C. depending on concentrations and compositions.

In some embodiments, the substrate is removed from the solution and heated at a temperature of about 100° C. to about 1000° C. for a period of about 0 hours to about 5 hours. In some embodiments, the substrate is removed from the solution and heated at a temperature of about 100° C. to about 1000° C. for a period of about 0 hours to about 24 hours to remove substantially all the water from the substrate and the metal oxide surface modification. Controlled atmospheric furnace treatments may be used to further modify the surface conditions.

Optionally, the substrate is dipped into a dilute solution (e.g., less than about 2%, or about 0.001% to about 2%) of a functional molecule with an appropriate solvent that is capable of chemically binding to the ceramic surface such the pores are functionalized but remain open.

In some embodiments, the method includes partially filling pores with one, two, or more material(s). For example, the method includes (a) taking the substrate with a surface immobilized porous ceramic surface, dipping it into a dilute solution of a functional molecule capable of chemically binding to the ceramic surface such that the pores are functionalized but remain open, and/or (b) dipping the substrate into another solution to deposit further ceramic within the pores and on the surface as described above, and heating to drive off water as before; and optionally repeating (a) or (b) or (a) and (b) to stack multiple layers within the pores of various functional molecules and/or metal oxides. Other nonlimiting methods of introducing the first or second material may be deployed such as spraying, pouring, dropping, or vapor phase deposition.

In some embodiments, the method includes completely filling the pores with one or more material(s). For example, the method includes taking the substrate with a surface immobilized porous ceramic surface, and dipping it into a more concentrated solution of a functional molecule capable of chemically binding to the ceramic surface (e.g., about 1% to about 20%) such that the pores are filled with a substance; and/or dipping the substrate into another metal salt solution as described above and driving off water as described above to completely fill the pores. Other nonlimiting methods of introducing the pore filling material may be deployed such as spraying, pouring, dropping, fogging, or vapor phase deposition.

Exemplary Embodiments

Exemplary embodiments of assemblies of materials as described herein are provided below. The combinations of materials and applications of use are provided as examples and are not intended to be limiting.

Medical Bandage

An assembly as described herein may be configured for use in a medical bandage. The bandage is designed to maintain cleanliness and to avoid external moisture through an external layer with superhydrophobic properties, an adsorbent layer to remove moisture from a wound, a padding layer to provide protection to the wound, and a hydrophilic inner layer that helps keep the wound dry. Each of the layers may be further functionalized with anti-microbial properties, or healing agents, salve, or other materials.

As shown in FIG. 1, an example of such an assembly includes an $A_t$ layer that includes a superhydrophobic ceramic on a synthetic substrate material (e.g., nylon or PET) and an $A_b$ layer that includes a superhydrophilic ceramic on a natural substrate material (cotton). B layers between the $A_t$ and $A_b$ layers provide absorption, structural and padding properties.

Performance Outerwear Apparel

An assembly as described herein may be configured for use in apparel, such as performance outerwear apparel. An inner layer may be provided that wicks moisture laterally and through the layer to the ambient top layer, an insulating layer, and an outer layer that has high moisture vapor transport rate and also repels water and oils, e.g., to promote cleanliness.

As shown in FIG. 2, an example of such an assembly includes an $A_t$ layer that includes a superhydrophobic ceramic on a synthetic substrate (e.g., nylon or PET) and an $A_b$ layer that includes a superhydrophobic ceramic on a synthetic substrate (e.g., nylon or PET). A B layer between the $A_t$ and $A_b$ layers provides a thermal insulation property.

Pipe Insulation

An assembly as described herein may be configured for use as pipe insulation or pipe protection. The assembly is designed as a high temperature thermal insulation jacket, with a hydrophobic "ambient side" liner and a hydrophilic "hot side" liner that surrounds and is in contact with the pipe. For example, the ambient side liner may be constructed from a metallic mesh (e.g., stainless steel mesh) with a ceramic (e.g., nanostructured) surface and hydrophobic functionality that maintains insulation performance by preventing moisture from entering insulation. The hot side liner may be constructed from metallic mesh with a ceramic (e.g., nanostructured) surface exhibiting capillary action to wick moisture and promote evaporation. The technical and commercial advantages of this system offer the same advantages as existing insulation jacket materials at a fraction of the cost, by combining the metallic mesh layer with the barrier layer. The system may also be capable of higher temperature operation than existing Teflon based solutions, and the system is externally waterproof yet vapor permeable, as opposed to metal foils.

As shown in FIG. 3, an example of such an assembly includes an $A_t$ layer that includes a superhydrophobic ceramic on a metal mesh substrate and an $A_b$ layer that includes a superhydrophilic ceramic on a metal mesh substrate. The B layer between the $A_t$ and $A_b$ layers provides a thermal insulation property.

Medical Cast

As an extension to the medical bandage application, described above, an assembly as described herein may be configured for use as a medical cast. An additional anti-microbial layer may be provided to the bottom of the stack of layers, to prevent infections and/or to prevent odor associated with difficulty cleaning, resulting in microbial incursion. Additional layers may also be added.

As shown in FIG. 4, an example of such an assembly includes an $A_t$ layer that includes a superhydrophobic ceramic on a synthetic substrate material (e.g., nylon or PET) and an $A_b$ layer that includes the bottom surface of the assembly and that includes an anti-microbial ceramic on a synthetic substrate material (e.g., nylon or PET). An $A_b$ layer above the $A_b$ layer that includes the bottom surface of the assembly includes a superhydrophilic ceramic on a synthetic substrate material (e.g., nylon or PET). B layers between the $A_t$ and $A_b$ layers provide structural and padding properties.

Medical/Surgical Apparel

An assembly as described herein may be configured for use in medical/surgical gear or apparel. The assembly is designed to be both breathable (high moisture transport rate) and antimicrobial and splatter resistant (water repellant), providing barrier properties without sacrificing comfort.

As shown in FIG. 5, an example of such an assembly includes an $A_t$ layer that includes a superhydrophobic ceramic on a synthetic substrate material (e.g., nylon or PET) and an $A_b$ layer that includes an anti-microbial ceramic on a synthetic (e.g., nylon or PET) or natural (e.g., cotton) substrate material.

Other Applications of Use

Additional non-limiting examples of applications in which assemblies of materials as described herein may be deployed include, with layers listed from bottom surface layer to top surface layer (ambient exposure) of the assembly:

Filtration/separation: size exclusion (retention) (A)—structural integrity (B)—antimicrobial (A)

Packing material: moisture transport (A)—structural integrity (B)—padding (B)—water repellent (A)

Hospital bedding: padding (B)—moisture transport (A)—breathability (A)—moisture absorbance (A)—antimicrobial (A)—

Protective masks: moisture transport (A)—breathability (A)—antimicrobial (A)—chemical resistance (A)—water repellant (A)

Protective apparel: moisture transport (A)—breathability (A)—chemical resistance (A)—water repellent (A)—thermal insulation (B)—structural (B)—flame retardant Architectural textile: moisture transport (A)—breathability (A)—chemical resistance (A)—water repellent (A)—thermal insulation (B)—flame retardant (A)—color (A)—UV stability (A)

Geo-textile: moisture transport (A)—breathability (A)—chemical resistance (A)—water repellent (A)—thermal insulation (B)—structural (B)—environmental stability (A)

The order of layers in the articles and applications of use described above may be different than those exemplified, and in some embodiments, multiple functionalities as described may be combined into a single layer.

The following examples are intended to illustrate, but not limit, the invention.

EXAMPLES

Example 1

Methods of Testing Layered Stack Performance

The following methods were deployed for characterization of assemblies of materials as described herein.

The contact angle of a layer was determined using the sessile drop method by dispensing a 10 microliter droplet on the surface. A camera positioned at the same height as the surface was used to capture an image of the droplet head on. The contact angle was determined by measuring angle between the surface and the liquid-vapor interface at the contacting surface. This process was repeated three times and the reported contact angle is the average of the three individual measurements.

The vapor transmission rate of a stack of layers was determined as follows. Each layer was cut to the same size and massed. A container filled with a known mass of dry desiccant was sealed to bottom side of the bottom layer of the stack. For a stack consisting of multiple layers, the layers were sealed together along their edges such the only way for vapor to enter the stack was to pass through the top layer of the stack. The stack and desiccant were placed in a chamber with controlled temperature and humidity. Every 30 minutes the samples were massed to determine the amount of water vapor from the chamber that had passed through the layers and adsorbed onto the desiccant. Once the mass of the desiccant increased by 10% the test was stopped and the rate of vapor transmission through each stack per unit area per unit time was determined.

The water column breakthrough pressure was determined as follows. A vertical tube with an inner diameter of 12.7 mm was sealed to the top layer of the stack. For a stack consisting of multiple layers, the layers were sealed together along their edges such that water could only enter or exit the stack by flowing through the top layer and bottom layer, respectively. The tube was filled by dispensing water down the side of the tube so as not to impinge water directly on the top layer of the stack. Water was dispensed incrementality such that the height of the water column was increased by 1 cm at a time followed by a 5 second period during which no water was dispensed. The column was filled in this manner until the height of the water column began to decrease, indicating breakthrough of the water in the column through the material stack. The maximum fill height of each sample was recorded.

Example 2

Functionalized mesh materials as described in the example below were prepared as follows. The mesh substrates were immersed first in a bath of acetone and then in a bath of IPA to remove any residual oils. The parts were then allowed to air dry for 15 minutes. Next the mesh substrates were placed into the production bath containing 20-250 mM of metal nitrate or sulfates or mixed metal nitrates or sulfates and a similar molar amount of a diamine, triamine, or tetramine that were allowed to react and settle at a reaction temperature of 50-85° C. The assemblies were maintained in the bath for times ranging from about 5 minutes to about 3 hours. The assemblies were removed and drained and placed into an oven to dry and/or calcine at 50-600° C. thermal processing for several minutes to several hours. This deposit and calcine step can optionally be repeated, if desired. After cooling, the parts were further processed and/or tested as described in the examples below.

Example 3

A stainless steel mesh layer was coated with a ceramic material composed of manganese oxide, thereby giving the surface hydrophilic properties. The water contact angle was measured to be less than 5 degrees via the sessile drop method. The layer was placed into a cup with about 1 cm of deionized water and a portion of the layered sample in contact with the deionized water. After 2 minutes the capillary rise as observed by a visible wet line was determined to be about 3 cm up the sample above the liquid level. Capillary rise was determined as described in PCT Application No. PCT/US19/65978 (see, e.g., FIGS. 1A-1C). The vapor transmission rate was determined to be 130 g/hr/m$^2$. The water column breakthrough pressure was tested and the layer was not able to support any measurable height of water column.

Example 4

A stainless steel mesh layer was coated with a ceramic material composed of manganese oxide. The surface was then functionalized using a dilute solution of hexadecylphosphonic acid in isopropanol, thereby giving the surface hydrophobic properties. The water contact angle was measured to be 151 degrees via the sessile drop method. The layer was placed into a cup with about 1 cm of deionized water. After 2 minutes there was no appreciable rise of water on the surface above the liquid level. The vapor transmission rate was determined to be 145 g/hr/m$^2$. The water column breakthrough pressure was determined to be 25 cm of water head.

Example 5

A stainless steel mesh layer without any surface preparation was tested. The water contact angle was measured to be 20 degrees via the sessile drop method. The layer was placed into a cup with about 1 cm of deionized water. After 2 minutes there was no appreciable rise of water on the surface above the liquid level. The vapor transmission rate was determined to be 152 g/hr/m$^2$. The water column breakthrough pressure was tested and the layer was not able to support any measurable height of water column.

Example 6

A fiberglass insulation layer with thickness of 5.08 cm and a thermal insulation value of R-6.7 was tested. The vapor transmission rate was determined to be 48 g/hr/m$^2$. The water column breakthrough pressure was tested and the layer was not able to support any measurable height of water column.

Example 7

A stack of two layers was tested. The top layer was a hydrophobic stainless steel mesh, as described in Example 3. The bottom layer was fiberglass insulation, as described in Example 5. The two layers were joined together by sealing the edges using Kapton tape in such a way that the insulation layer was not compressed. The vapor transmission rate of the entire stack was determined to be 43 g/hr/m$^2$. The water column breakthrough pressure of the entire stack was determined to be 23 cm of water head.

Example 8

A stack of two layers was tested. The top layer was a stainless steel mesh without any surface preparation, as described in Example 4. The bottom layer was fiberglass insulation, as described in Example 5. The two layers were joined together by sealing the edges using Kapton tape in such a way that the insulation layer was not compressed. The vapor transmission rate of the entire stack was determined to be 49 g/hr/m$^2$. The water column breakthrough pressure was tested and the layer was not able to support any measurable height of water column.

Example 9

A stack of three layers was tested. The top layer was a hydrophobic stainless steel mesh, as described in Example 3. The middle layer was fiberglass insulation, as described in Example 5. The bottom layer was a hydrophilic stainless steel mesh, as described in Example 2. The three layers were joined together by sealing the edges using Kapton tape in such a way that the insulation layer was not compressed. The vapor transmission rate of the entire stack was determined to be 53 g/hr/m$^2$. The water column breakthrough pressure of the entire stack was determined to be 22 cm of water head.

Example 10

A stack of three layers was tested. The top layer was a stainless steel mesh without any surface alteration, as described in Example 4. The middle layer was fiberglass insulation, as described in Example 5. The bottom layer was a stainless steel mesh without any surface alteration, as described in Example 4. The vapor transmission rate of the entire stack was determined to be 55 g/hr/m$^2$. The water column breakthrough pressure was tested and the layer was not able to support any measurable height of water column.

Example 11

An aluminum mesh layer is coated with a ceramic material composed of magnesium oxide, thereby giving the surface hydrophilic properties. The water contact angle is measured to be less than 5 degrees via the sessile drop method. The layer is placed into a cup with about 1 cm of deionized water. After 2 minutes the capillary rise is determined to be about 5 cm above the liquid level. The vapor transmission rate is determined to be 150 g/hr/m$^2$. The water column breakthrough pressure is tested, the layer is not able to support any measurable height of water column.

Example 12

An aluminum mesh layer is coated with a ceramic material composed of magnesium oxide. The surface is then functionalized using a dilute solution of hexadecylphosphonic acid in isopropanol, thereby giving the surface hydrophobic properties. The water contact angle is measured to be 160 degrees via the sessile drop method. The layer was placed into a cup with about 1 cm of deionized water. After 2 minutes there is no appreciable rise of water on the surface above the liquid level. The vapor transmission rate is determined to be 150 g/hr/m$^2$. The water column breakthrough pressure is determined to be 100 cm of water head.

Example 13

An aluminum mesh layer without any surface preparation is tested. The water contact angle is measured to be 20 degrees via the sessile drop method. The layer was placed into a cup with about 1 cm of deionized water. After 2 minutes there is no appreciable rise of water on the surface above the liquid level. The vapor transmission rate is determined to be 153 g/hr/m$^2$. The water column breakthrough pressure is tested, and the layer was not able to support any measurable height of water column.

Example 14

A stack of two layers is tested. The top layer is a hydrophobic aluminum mesh, as described in Example 11. The middle layer is fiberglass insulation, as described in Example 5. The two layers are joined together by sealing the edges using Kapton tape in such a way that the insulation layer is not compressed. The vapor transmission rate of the entire stack is determined to be 48 g/hr/m$^2$. The water column breakthrough pressure of the entire stack is determined to be 62 cm of water head.

Example 15

A stack of two layers is tested. The top layer is an aluminum mesh without any surface preparation, as described din Example 12. The middle layer is fiberglass insulation, as described in Example 5. The two layers are joined together by sealing the edges using Kapton tape in such a way that the insulation layer is not compressed. The vapor transmission rate of the entire stack is determined to be 48 g/hr/m$^2$. The water column breakthrough pressure is tested, and the layer is not able to support any measurable height of water column.

Example 16

A stack of three layers is tested. The top layer is a hydrophobic aluminum mesh, as described in Example 11. The middle layer is fiberglass insulation, as described in Example 5. The bottom layer is a hydrophilic aluminum mesh, as described in Example 10 The three layers are joined together by sealing the edges using Kapton tape in such a way that the insulation layer is not compressed. The vapor transmission rate of the entire stack is determined to be 48 g/hr/m$^2$. The water column breakthrough pressure of the entire stack is determined to be 62 cm of water head.

Example 17

A stack of three layers is tested. The top layer is an aluminum mesh without any surface alteration, as described in Example 12. The middle layer is fiberglass insulation, as described in Example 5. The bottom layer is aluminum mesh without any surface alteration, as described in Example 12. The three layers are joined together by sealing the edges using Kapton tape in such a way that the insulation layer is not compressed. The vapor transmission rate of the entire stack is determined to be 47 g/hr/m$^2$. The water column breakthrough pressure is tested, and the layer is not able to support any measurable height of water column.

Example 18

A moisture barrier layer of a polyester film with thickness of 0.005 cm was tested. The vapor transmission rate was determined to be 1 g/hr/m$^2$. The water column breakthrough pressure was determined to be greater than 200 cm of water head.

Example 19

A stack of two layers was tested. The top layer was a polyester film, as described in Example 16. The bottom layer was fiberglass insulation, as described in Example 4. The vapor transmission rate was determined to be 1 g/hr/m$^2$. The water column breakthrough pressure was determined to be greater than 200 cm of water head.

Example 20

A 40 d (40 denier) woven polyamide textile layer was coated with a ceramic material composed of magnesium oxide, thereby giving the surface hydrophilic properties. The water contact angle was measured to be less than 5 degrees via the sessile drop method. The vapor transmission rate was determined to be 175 g/hr/m$^2$. The water column breakthrough pressure was tested and the layer was not able to support any measurable height of water column.

Example 21

A 40 d woven polyamide textile layer was coated with a ceramic material composed of magnesium oxide. The surface was then functionalized using a dilute solution of hexadecylphosphonic acid in isopropanol, thereby giving the surface hydrophobic properties. The vapor transmission rate was determined to be 170 g/hr/m$^2$. The water column breakthrough pressure was determined to be 55 cm of water head.

Example 22

A 40 d woven polyamide textile layer without any surface preparation was tested. The vapor transmission rate was determined to be 170 g/hr/m$^2$. The water column breakthrough pressure was tested and the layer was not able to support any measurable height of water column.

Example 23

A Thinsulate G80 layer with thickness of 1.1 cm and a thermal insulation value of R-1.6 is tested. The vapor transmission rate is determined to be 100 g/hr/m$^2$. The water column breakthrough pressure is tested and the layer is not able to support any measurable height of water column.

Example 24

A stack of two layers is tested. The top layer is hydrophobic 40 d woven polyamide textile, as described in Example 19. The bottom layer is Thinsulate G80, as described in Example 21. The vapor transmission rate of the entire stack is determined to be 100 g/hr/m$^2$. The water column breakthrough pressure of the entire stack is determined to be 55 cm of water head.

Example 25

A stack of two layers is tested. The top layer is 40 d woven polyamide textile without any surface preparation, as described in Example 20. The bottom layer is Thinsulate G80, as described in Example 21. The vapor transmission rate of the entire stack is determined to be 100 g/hr/m$^2$. The water column breakthrough pressure is tested and the layer is not able to support any measurable height of water column.

Example 26

A stack of three layers is tested. The top layer is hydrophobic 40 d woven polyamide textile, as described in Example 19. The middle layer is Thinsulate G80, as described in Example 21. The bottom layer is hydrophilic 40 d woven polyamide textile, as described in Example 18. The vapor transmission rate of the entire stack is determined to be 90 g/hr/m$^2$. The water column breakthrough pressure of the entire stack is determined to be 50 cm of water head.

Example 27

A stack of three layers is tested. The top layer is 40 d woven polyamide textile without any surface alteration, as described in Example 20. The middle layer is Thinsulate G80, as described in Example 21. The bottom layer is 40 d woven polyamide textile without any surface alteration, as described in Example 20. The vapor transmission rate of the entire stack is determined to be 90 g/hr/m$^2$. The water column breakthrough pressure is tested and the layer is not able to support any measurable height of water column.

Example 28

A stainless steel mesh layer was pitted in an acid etch and then coated with a binderless structured manganese oxide ceramic surface modification that was deposited in a 25 to 75 mM aqueous solution of manganese nitrate and a similar quantity of hexamethylenetetramine or urea at a temperature of about 60° C. to 80° C. for a time period of about 60 to 240 minutes. The mesh was then calcined at a temperature of about 400° C. to 600° C. for about 1 hour, giving the surface hydrophilic properties. The water contact angle was measured to be less than 5 degrees via the sessile drop method. The mesh was placed into a cup with about 1 cm of deionized water. After 2 minutes the capillary rise was determined to be about 3 cm above the liquid level. Capillary rise was determined as described in PCT Application No. PCT/US19/65978 (see, e.g., FIGS. 1A-1C). The vapor transmission rate was determined to be 130 g/hr/m$^2$. The water column breakthrough pressure was tested and the layer was not able to support any measurable height of water column.

Example 29

An aluminum mesh layer was coated with a ceramic material composed of magnesium oxide that was deposited in a 25 to 75 mM aqueous solution of magnesium nitrate and a similar quantity of hexamethylenetetramine at a temperature of about 60° C. to 80° C. for a time period of about 30 to 90 minutes. The mesh was then calcined at a temperature of about 300° C. to 600° C. for about 1 hour, thereby giving the surface hydrophilic properties. The water contact angle is measured to be less than 5 degrees via the sessile drop method. The layer is placed into a cup with about 1 cm of deionized water. After 2 minutes the capillary rise was determined to be about 5 cm above the liquid level. The vapor transmission rate was determined to be about 150 g/hr/m$^2$. The water column breakthrough pressure was tested; the layer was not able to support any measurable height of water column.

Example 30

A woven polyester textile and woven nylon textile were sputtered with about 250 nm of aluminum. The textile was cut into smaller pieces and coated with 3 different ceramic materials: a) a magnesium oxide/hydroxide-based ceramic, b) and manganese oxide/hydroxide based ceramic, c) and a zinc oxide/hydroxide based ceramic. All three ceramics contained quantities of aluminum oxide/hydroxide. The ceramics were deposited in methods similar to the method described in Example 1 (using the 2+ metal nitrate or metal sulfate salt for each respective cation found in the ceramic). The samples were tested for contact angle and exhibited a contact angle less than 15 degrees. The ceramic modified textiles were then dip coated into a dilute bath (0.1% to 1%) of hexadecylphosphonic acid in isopropanol or hexadecyltriethoxysilane in ethanol. In the case of the silane, small quantities of an acetic acid catalyst were sometimes used. The samples were then measured for contact angle again and exhibited contact angles of about 150 to 160 degrees. The moisture vapor transmission was within error of the measurement of the unmodified fabric.

Example 31

Woven polyester, polyamide, and Tencel textiles were coated with a zinc oxide based ceramic by dipping the textile in a batch of about 200-500 mM zinc sulfate, about 50-150 mM of potassium persulfate, and about 1.2 to 1.7 molar ammonium hydroxide for about 5 to 60 minutes at room temperature. Nickel oxide deposits were also created on polyester by substituting the zinc sulfate with nickel sulfate. Manganese oxide deposits were also created on polyester by substituting the zinc sulfate with manganese sulfate and substituting the persulfate with a permanganate. These samples were then dried at a temperature of about 105 C to about 140 C for a duration of about 1 to 2 hours. The samples were tested for contact angle and exhibited a contact angle less than 15 degrees. The ceramic modified textiles were then dip coated into a dilute bath (0.1% to 1%) of hexadecylphosphonic acid in isopropanol or hexadecyltriethoxysilane in ethanol. In the case of the silane, small quantities of an acetic acid catalyst were sometimes used. The samples were then measured for contact angle again and exhibited contact angles of about 150 to 160 degrees.

Example 32

Woven polyamide and polyester textiles were submerged in an aqueous bath of about 5 to 200 mM of potassium permanganate and about 10 to 400 mM of ammonium hydroxide at a temperature of about room temperature to about 80 C for about 5 minutes to about 1 hour. Typical ratios of permanganate to ammonium hydroxide were about 1 to 2. The substrate was then allowed to dry and then deposited with a structured ceramic layer comprising manganese oxides/hydroxides, zinc oxides/hydroxides, or magnesium oxides/hydroxides by dipping the substrate in a 25 to 150 mM aqueous solution of metal (Mn, Zn, or Mg) nitrate and a similar quantity of hexamethylenetetramine at a temperature of about 60° C. to 80° C. for a time period of about 5 to 90 minutes. The mesh was then dried at a temperature of about 100° C. to 250° C. for about 1 hour. These contact angle of the samples was measured and determined to be less than about 15 degrees. The ceramic modified textiles were then dip coated into a dilute bath (0.1% to 1%) of hexadecylphosphonic acid in isopropanol or hexadecyltriethoxysilane in ethanol. In the case of the silane, small quantities of an acetic acid catalyst were sometimes used. The samples were then measured for contact angle again and exhibited contact angles of about 150 to 160 degrees.

Although the foregoing invention has been described in some detail by way of illustration and examples for purposes of clarity of understanding, it will be apparent to those skilled in the art that certain changes and modifications may be practiced without departing from the spirit and scope of the invention, which is delineated in the appended claims. Therefore, the description should not be construed as limiting the scope of the invention.

All publications, patents, and patent applications cited herein are hereby incorporated by reference in their entireties for all purposes and to the same extent as if each individual publication, patent, or patent application were specifically and individually indicated to be so incorporated by reference.

We claim:

1. An assembly of materials comprising a top surface and a bottom surface, comprising:
    (a) x $A_t$ layers of breathable material, wherein the $A_t$ layers comprise a topmost layer that comprises the top surface;
    (b) y $A_b$ layers of breathable material, wherein the $A_b$ layers comprise a bottommost layer that comprises the bottom surface; and
    (c) z B layers of breathable insulating or structural material between x $A_t$ layers and y $A_b$ layers, wherein x, y, and z are the same or different number of layers, wherein the $A_t$ layers and the $A_b$ layers each comprise a binderless ceramic material on a substrate, wherein the binderless ceramic material on at least one $A_t$ layer and/or at least one $A_b$ layer is a partially filled porous structure, wherein pores of the binderless ceramic material are partially filled with a second ceramic material or with a molecule with a head group and a tail group, and wherein the binderless ceramic material on each $A_t$ layer and/or each $A_b$ layer is the same or different.

2. The assembly according to claim 1, wherein the binderless ceramic material comprises crystalline ceramic material.

3. The assembly according to claim 1, wherein the binderless ceramic material comprises a metal oxide, a hydrate of a metal oxide, a metal hydroxide, a hydrate of a metal hydroxide, and/or a layered double hydroxide.

4. The assembly according to claim 1, wherein the binderless ceramic material is a nanostructured ceramic.

5. The assembly according to claim 1, wherein the substrate for at least one $A_t$ layer and/or at least one $A_b$ layer comprises a material selected from: a synthetic or natural textile that is woven, non-woven, or knit, a metal mesh, a metal screen, a metal cloth, a synthetic or natural polymer material or film.

6. The assembly according to claim 5, wherein the substrate for at least one $A_t$ layer and the substrate for at least one $A_b$ layer, or the substrates for at least two $A_t$ layers, or the substrates for at least two $A_b$ layers comprise different materials selected from: a synthetic or natural textile that is woven, non-woven, or knit, a metal mesh, a metal screen, a metal cloth, a synthetic or natural polymer material or film.

7. The assembly according to claim 1, wherein each $A_t$ layer and/or $A_b$ layer comprises one or more additional functional properties selected from: ice or condensate management, anti-ice, anti-frost, superhydrophobicity, superhydrophilicity, inhibition of microbial growth, corrosion resistance, electromagnetic modulation, thermal modulation, flame retardancy, dynamic wind resistance, color, absorption, barrier, maintenance properties, aesthetic properties, odor control, abrasion resistance, mechanical properties, surface friction, handfeel, durability or a combination thereof.

8. The assembly according to claim 7, wherein x and/or y is greater than 1, and wherein each $A_t$ layer and/or $A_b$ layer comprises a different functional property than other $A_t$ layers and/or $A_b$ layers.

9. The assembly according to claim 7, wherein the topmost layer that comprises the top surface and the bottommost layer that comprises the bottom surface comprise the same additional functional properties.

10. The assembly according to claim 7, wherein the topmost layer that comprises the top surface and the bottommost layer that comprises the bottom surface comprise different additional functional properties.

11. The assembly according to claim 1, wherein at least one $A_t$ layer and/or at least one $A_b$ layer comprises a top coat material that imparts one or more functional property, and wherein at least one functional property imparted by the top coat material is of greater magnitude than the same functional property imparted by an identical top coat material deposited directly on an identical substrate that does not comprise the binderless ceramic material.

12. The assembly according to claim 1, wherein at least one $A_t$ layer and/or at least one $A_b$ layer comprises a top coat material, and wherein the binderless ceramic material and the top coat material synergistically impart one or more functional property that is of greater magnitude than the same functional property imparted by either the binderless ceramic material or the top coat material deposited independently on an identical substrate surface.

13. The assembly according to claim 1, wherein each B layer comprises one or more structural properties selected from: thermal resistance, electrical resistance, structural support, mechanical padding, and fluid transfer characteristics, or a combination thereof.

14. The assembly according to claim 1, wherein one or more B layer comprises a ceramic material selected from: glass fiber, loose ceramics, and other inorganic materials.

15. The assembly according to claim 1, wherein the assembly is incorporated into performance outerwear apparel, a medical bandage, a medical cast, a surgical gown, filtration or separation media, packing material, hospital bedding, absorptive textiles, a protective mask, protective apparel, an architectural textile, or a geo-textile.

16. A textile material, comprising the assembly of claim 1, wherein one or more $A_t$ layer comprises a hydrophobic or superhydrophobic functional property, wherein one or more B layer comprises a thermal insulating, protective, or structural property, and wherein one or more $A_b$ layer comprises a hydrophilic or superhydrophilic functional property.

17. The textile material according to claim 16, wherein the substrate of one or more $A_t$ layer and/or one or more $A_b$ layer comprises a woven material.

18. The textile material according to claim 16, wherein one or more B layer comprises a material selected from: polyester, fleece, wool, feathers, down, and other organic materials.

19. The assembly or textile material according to claim 1, wherein the assembly of materials is externally waterproof yet vapor permeable.

20. The assembly according to claim 19, wherein the assembly of materials is waterproof as measured by contact angle and vapor permeable as measured by vapor transmission rate.

* * * * *